United States Patent
Kazenas et al.

(10) Patent No.: US 8,380,618 B1
(45) Date of Patent: Feb. 19, 2013

(54) SYSTEMS AND METHODS FOR ISSUING CREDIT FOR UNUSED INTEREST FREE GRACE PERIODS

(75) Inventors: Joseph Alfred Kazenas, Boerne, TX (US); Teddy Joseph Edmund Voutour, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 356 days.

(21) Appl. No.: 12/364,153

(22) Filed: Feb. 2, 2009

(51) Int. Cl.
*G06Q 40/00* (2006.01)

(52) U.S. Cl. .......................................... 705/38; 705/40

(58) Field of Classification Search .................. 705/34, 705/35, 38, 40, 30
See application file for complete search history.

(56) References Cited

U.S. PATENT DOCUMENTS

| | | | |
|---|---|---|---|
| 7,702,547 B2 * | 4/2010 | Kalra et al. | ..................... 705/34 |
| 2002/0063153 A1 | 5/2002 | Stack et al. | |
| 2002/0165808 A1 | 11/2002 | Zamsky et al. | |
| 2006/0287917 A1 * | 12/2006 | Graham, Sr. | ..................... 705/14 |
| 2007/0094126 A1 | 4/2007 | Bufford | |
| 2008/0033873 A1 | 2/2008 | Krishnamoorthy et al. | |

OTHER PUBLICATIONS

"Unused satellite phone minutes now carry forward, m-Travel.com and Travel Distribution News", http://www.m-travel.com/news/2004/01/unused_satellit.html, Nov. 15, 2008, pp. 1-7.

* cited by examiner

*Primary Examiner* — Ojo O Oyebisi
(74) *Attorney, Agent, or Firm* — Brooks, Cameron & Huebsch, PLLC

(57) ABSTRACT

A system for issuing credit for unused interest free grace periods may comprise at least one subsystem that electronically calculates a number of unused interest free grace period days, and at least one subsystem that electronically calculates an amount of an award to a borrower based on the calculated number of unused grace period days and a statement balance paid by the borrower.

33 Claims, 7 Drawing Sheets

SYSTEMS AND METHODS FOR ISSUING CREDIT FOR UNUSED INTEREST FREE GRACE PERIODS

BACKGROUND

A "credit card grace period" is generally the time between the end of one's billing cycle and one's payment due date. Essentially, this window, usually between 20 and 25 days, allows a payment to be made for the prior billing cycle's purchases without accruing any interest on those items. The due date, as noted on the credit card statement, is typically the time when the grace period ends, and after that, one will begin accruing interest on any unpaid portion of one's balance if the annual percentage rate (APR) on the card is greater than 0%. However, if one typically carries a balance on the credit card from month to month and fails to pay the account in full, this grace period is ultimately wiped out in some cases.

Some of the different types of credit card grace periods are described below:

Full Grace Period

This type of grace period allows one to carry a balance from prior billing cycles (each billing cycle typically being a month) and still avoid interest on purchases made during the most recent billing cycle, assuming they are paid off entirely within the 20-25 day window. There will still be interest charged on the portion that is carried over, but new purchases paid for within the grace period that correspond to the latest billing cycle will be interest free. Therefore, if a balance is carried over from a previous billing cycle, but the statement balance is paid in full within the grace period, one will be charged interest on the "average daily balance excluding new purchases," meaning any balance carried over from previous billing cycles accrues interest by way of average daily balance, with new purchases excluded from this computation. (New purchases are those which are a part of the most recent billing cycle.)

Standard Grace Period

Unfortunately, the above formula is pretty rare, as most credit card issuers charge interest on all purchases immediately if one has a previous outstanding balance. But if the credit card statement balance is paid in full every month, this will work like a full grace period. No interest will be charged as long as the full statement balance payment is made within the allotted time designated by the grace period each month. Therefore, if a balance is carried over from a previous billing cycle, but the statement balance is paid in full within the grace period, one will be charged interest on the "average daily balance including new purchases," meaning balances carried over from previous months as well as new purchases accrue interest based on the average daily balance computing model. So in this case, any outstanding balance from a prior billing cycle will essentially eliminate one's grace period because any new charges accrue interest immediately.

No Grace Period

There are also situations where this is no grace period whatsoever. Typically, cash advances and convenience checks have no grace period, and as a result, interest begins to accrue the minute one withdraws the funds. This can also be the case with some department store credit cards.

However, even if a borrower pays off the statement balance within the grace period (whether it is a full or standard grace period), there is currently no benefit or credit given to the borrower for not using those interest free grace period days remaining before the end of the grace period.

In this regard, there is a need for systems and methods that overcome the shortcomings described above and others.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for issuing credit for unused interest free grace periods are provided. For several embodiments, a system for issuing credit for unused interest free grace periods may comprise at least one subsystem that electronically calculates a number of unused interest free grace period days, and at least one subsystem that electronically calculates an amount of an award to a borrower based on the calculated number of unused grace period days and a statement balance paid by the borrower.

Other features and embodiments are described below.

BRIEF DESCRIPTION OF THE DRAWINGS

Systems methods for issuing credit for unused interest free grace periods are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
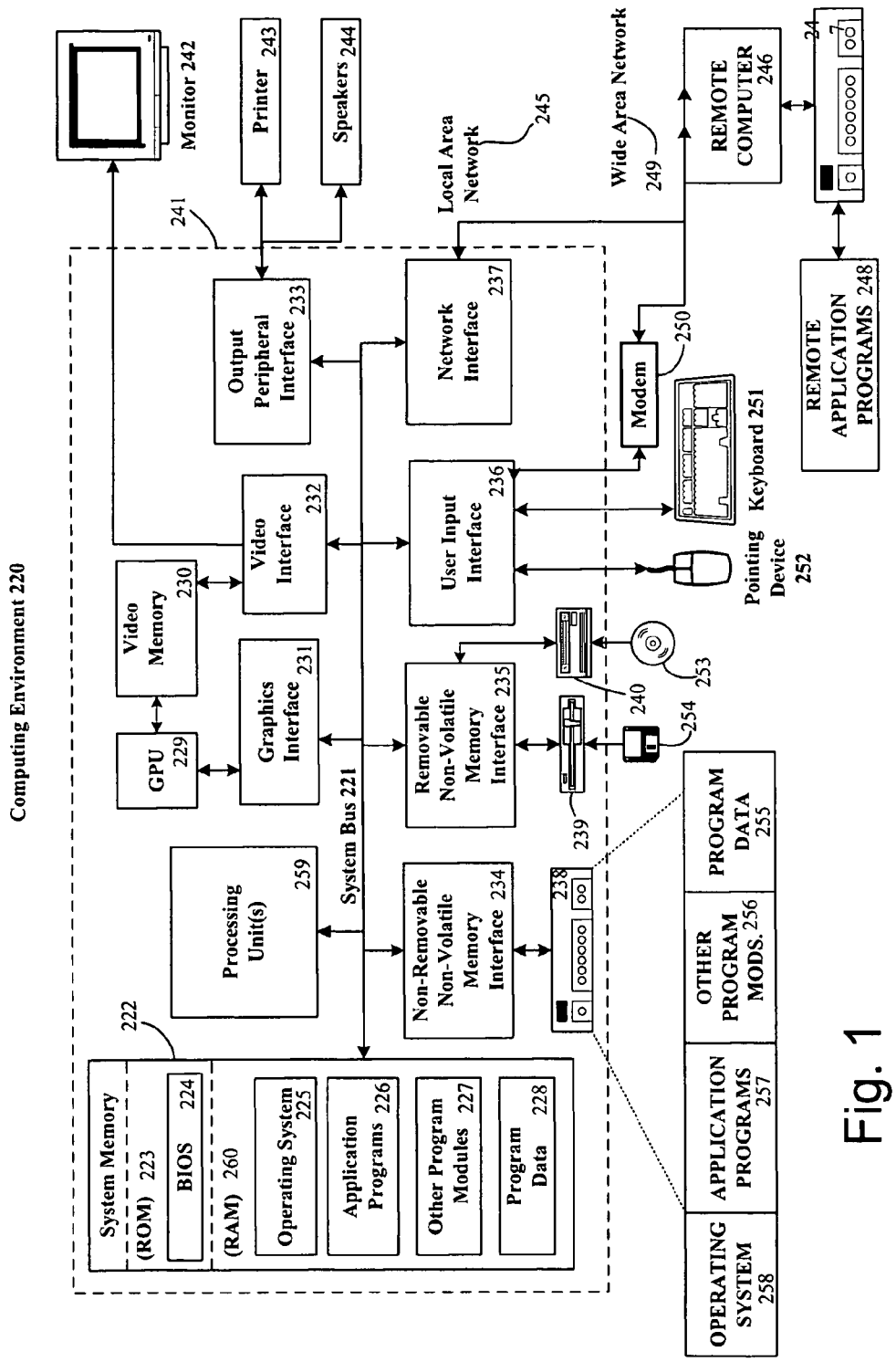
FIG. 1 is a block diagram representing an exemplary computing environment suitable for use in conjunction with implementing systems and methods for issuing credit for unused interest free grace periods.

Referring next to FIG. 1, shown is a block diagram representing an exemplary computing environment suitable for use in conjunction with implementing the processes described below. For example, the computer-executable instructions that carry out the processes and methods for issuing credit for unused interest free grace periods may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a mobile device may also include one or more items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU) 229, video memory 230, and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. As used herein a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform the intended function of the system or subsystem. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
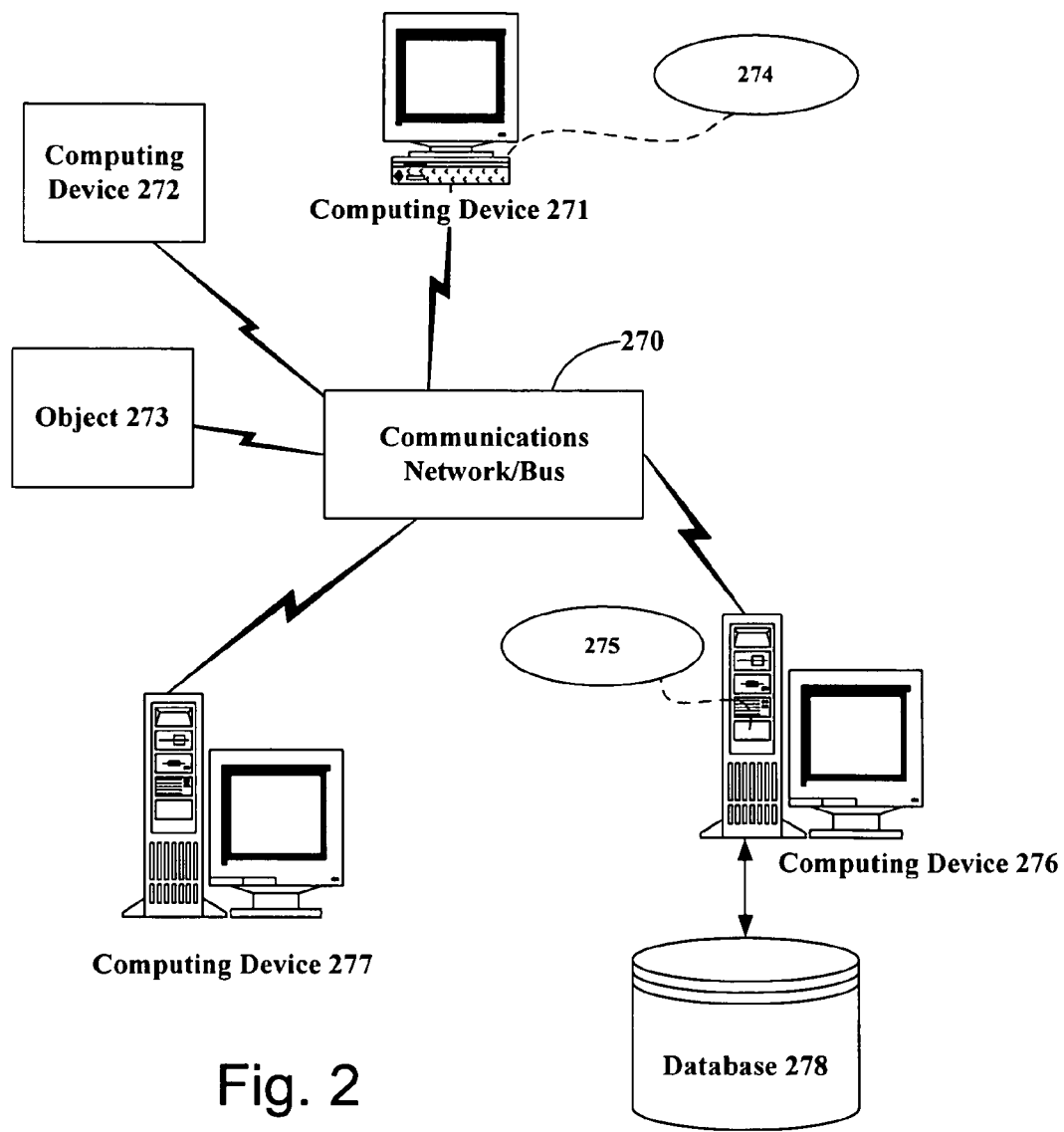
FIG. 2 illustrates an exemplary networked computing environment in which many computerized processes may be implemented to perform providing systems and methods for issuing credit for unused interest free grace periods.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing systems and methods for issuing credit for unused interest free grace periods. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
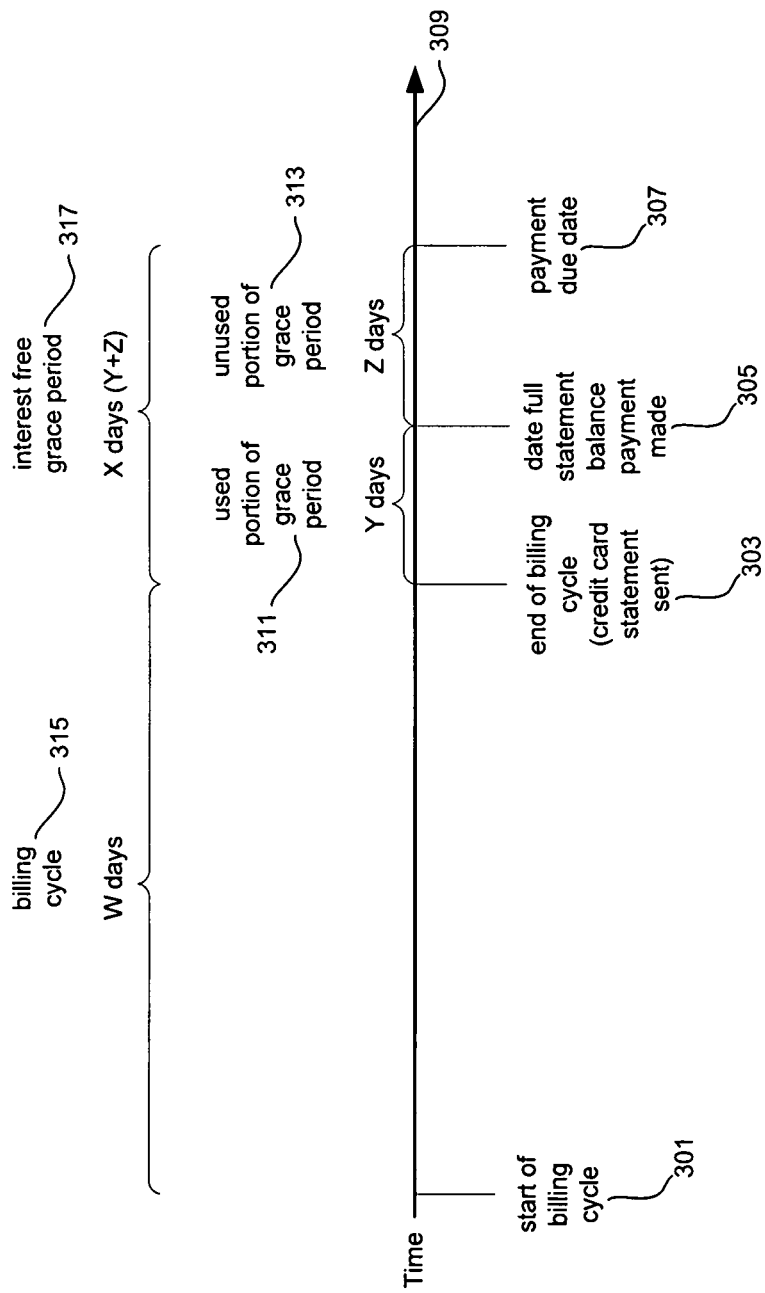
FIG. 3 is a timeline illustrating an example credit card billing cycle along with example used and unused portions of an interest free grace period.

Referring next to FIG. 3, shown is a timeline illustrating an example credit card billing cycle along with example used and unused portions of an interest free grace period. Shown is the billing cycle 315, with w days in the present example. A billing cycle is usually considered the interval between periodic billings for goods sold or services rendered. Here, the services rendered may be considered the provision of a line of credit to the customer. Although the billing cycle 315 may, for example, be referred to herein as a credit card billing cycle, the same or similar example timeline 309 may also apply to billing cycles of other loans including but not limited to: home loans, home equity loans, business loans, student loans, auto loans, personal lines of credit, vehicle loans, etc. Shown is the example timeline 309 with a point marked as the start of the billing cycle 301. The exact day of the start of the billing cycle may often be chosen by the borrower or lender, but often occurs on the same day every month. However, the billing cycle need not be monthly, but could be bi-weekly, quarterly, yearly, other intervals of time as well. Also, shown is a point marked as the end of the billing cycle 303. At the end of the billing cycle 303, a statement or bill is usually sent to the borrower. This may be a paper bill sent through the mail, but increasingly the bills are being delivered and the payments are being accepted both electronically, thus increasing the chance that the borrower will pay the bill (and the lender will receive the payment) earlier.

Next shown on the timeline is the interest free grace period 317 offered by many lenders (especially credit card lenders). As described in the background section above, an interest free grace period for credit cards is generally the time between the end of the billing cycle and the payment due date 307. Essentially, this window, usually between 20 and 25 days, allows one to make a payment for the prior month's purchases without accruing any interest on those items if an unpaid balance has not been carried forward from a previous billing cycle. Herein "interest free grace period" and "grace period" may be used interchangeably. Also, the "interest free grace period" or "grace period" may apply to other types of loans as well as described above with respect to the timeline 309. As shown in the example, the grace period is x days long and the borrower has paid the full statement balance 305 y number of days after the end of the billing cycle 315. This leaves z number of days of unused grace period 313. Ostensibly, the borrower could have used z more interest free days, but did not, and thus the lender, instead of the borrower, has benefited from the unused z interest free grace period days on the statement balance amount by receiving the payment early.

Figure 4:
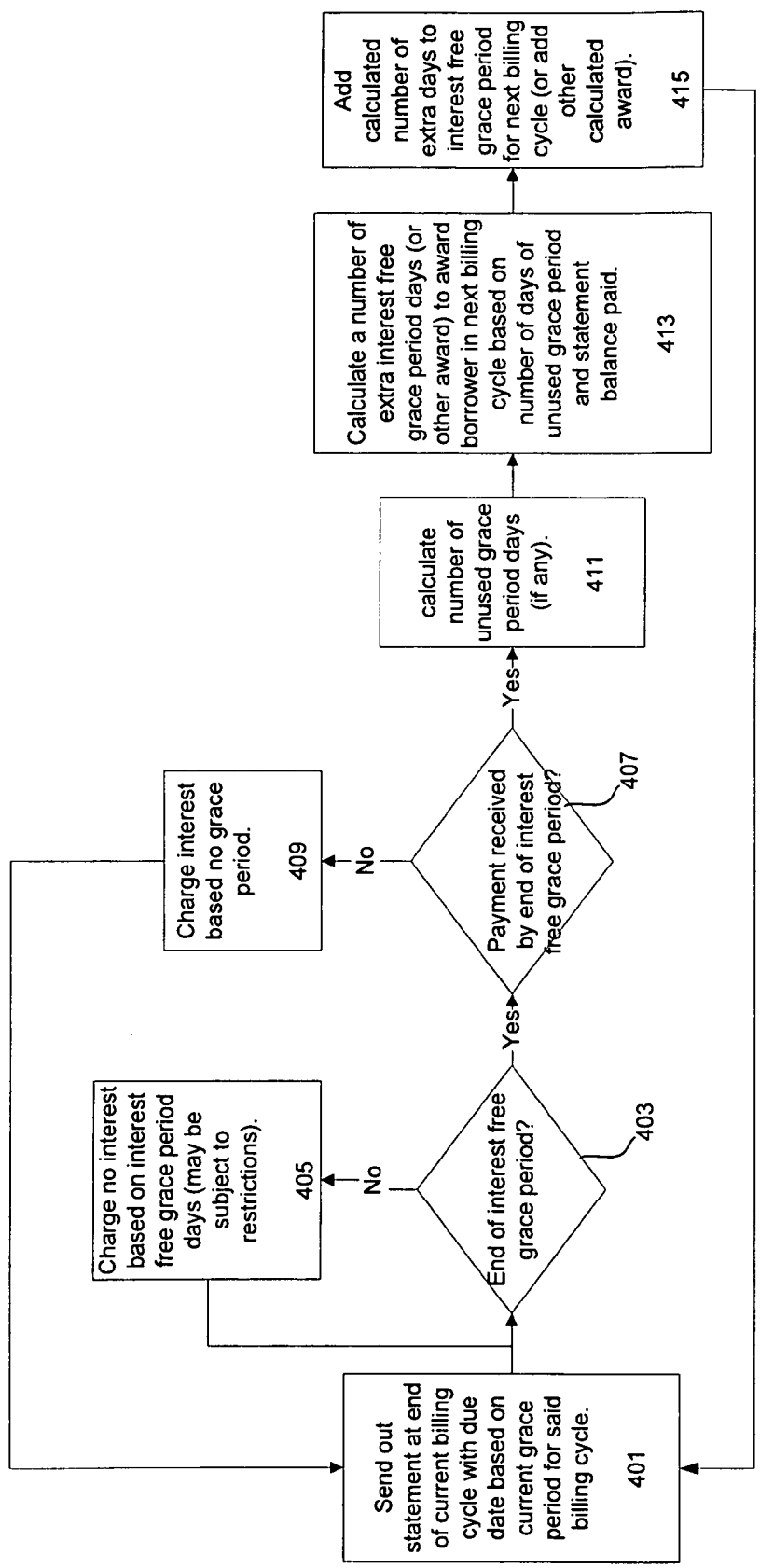
FIG. 4 is a flow chart illustrating an example process for issuing credit for unused interest free grace periods.

Referring next to FIG. 4, shown is a flow chart illustrating an example process for issuing credit for unused interest free grace periods. First, the lender sends out a statement or bill at end of the current billing cycle to the borrower with a due date based on current grace period for said billing cycle (i.e., the due date being the next day after the grace period expires). The statement has a statement balance due that the borrower must pay by the end of the current grace period to avoid interest charges on the charges made within the current billing cycle (i.e., the billing cycle to which the statement pertains). It is then determined (403) whether the interest free grace period has expired. If it has not, then no interest is charged (405) on the statement balance (which may be subject to certain restrictions depending on the type of grace period, if there was an unpaid balance carried forward from a previous billing cycle, or there are certain dollar amount limits for which the grace period days are interest free).

If the grace period has expired, then it is determined (407) whether the payment was received by the end of the grace period. As another example, some lenders may allow the payment to have been sent by the expiration of the grace period instead of received. If the payment was not received (or sent) by the end of the grace period, then interest may be charged as if there was no grace period. If the payment was received (or sent) by the end of the grace period, then the number of remaining or unused grace period days (if any) is calculated (411) with respect to the balance paid. Then a system, such as that having one or more components described above with reference to FIGS. 1 and 2, calculates a number of extra interest free grace period days (or other award) to award the borrower available for use in the next or subsequent billing cycles based on the number of unused grace period days and the statement balance paid. The process may then be repeated for the next billing cycle starting with sending out (401) a statement at end of the next billing cycle with a new due date based on current grace period for said billing cycle.

An option may be provided to the borrower wherein the borrower may electronically select a different award instead of receiving one or more of the extra interest free grace period days, the different award may comprise, but are not limited to of one or more of the following: a rebate, a reward, points, a coupon, travel miles, free insurance on purchases, credit card payment protection insurance, skipping one or more payments interest free, cash back, reduced interest rate, putting positive information on a credit report of the borrower, putting positive information on an internal credit report or evaluation of the borrower, instantly reducing a balance due within the current billing cycle, and increasing a credit limit of the borrower.

The exact amount of extra grace period days or other award to issue is variable and may be determined by the lender or selectable by the borrower. These amounts may be calculated using a formula implemented on a computing device taking into account the value of the unused grace period days. For example, the value of the unused grace period days may be based on the number of unused grace period days and the statement balance paid by the borrower. The underlying principle being that the borrower could have used those grace period days to borrow the statement balance (interest free) for an extra number of days equal to that portion of the unused grace period, but gave that money to the lender, who then could earn interest on that money instead. Another factor contributing to the value of interest free grace period days in general may include but is not limited to the credit limit of the borrower, since the borrower has a right to carry a balance equal to their credit limit for the full interest free grace period, even though they may choose not no. Described below are some particular examples of how a lender may calculate and award, "rollover," or otherwise give credit for unused grace period days, however, other processes may be used and these examples are not intended to be limited to the particulars disclosed herein.

Figure 5:
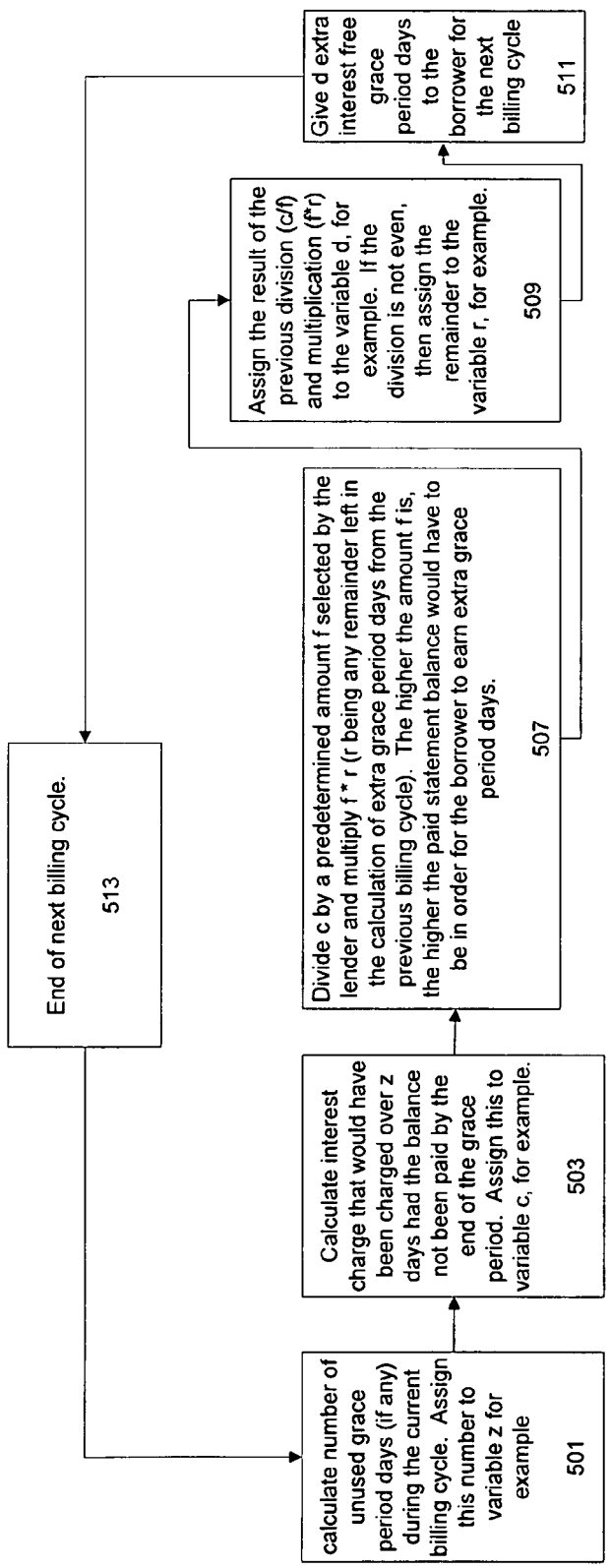
FIG. 5 is a flow chart illustrating an example process for issuing credit for unused interest free grace period days by awarding one or more extra interest free grace period days.

Referring next to FIG. 5, shown is a flow chart illustrating an example process for issuing credit for unused interest free grace period days by awarding one or more extra interest free grace period days. The processes described below may be implemented in an automated fashion on one or more processors such as those described in FIGS. 1 and 2, or the like. First, calculate (501) the number of unused grace period days (if any) during the current billing cycle. Assign this number to variable z, for example. Then calculate (503) the interest charge that would have been charged over z days had the balance not been paid by the end of the grace period. Assign this to variable c, for example.

Divide c by a predetermined amount f selected by the lender (507) and also multiply f times r (r being any remainder left in the calculation of extra grace period days from the previous billing cycle). The higher the amount f is, the higher the paid statement balance would have to be in order for the borrower to earn one or more extra grace period days. For example, the lender may value awarded extra grace period days according to the credit limit of the borrower because the borrower may potentially use any awarded extra interest free grace period days as interest free days against a statement amount equal to the credit limit. Thus, the lender may choose to make f equal to the current credit limit of the borrower, for example.

Then assign (509) the result of the previous division c/f and multiplication r*f (507) to the variable d, for example. If the division is not even, then assign the remainder to the variable r, for example. Finally, give (511) d extra interest free grace period days (511) to the borrower for the next billing cycle. Once the end of the next billing cycle is reached (513), the process may be repeated, staring again with calculating (501) the number of unused grace period days (if any) during the current billing cycle.

Figure 6:
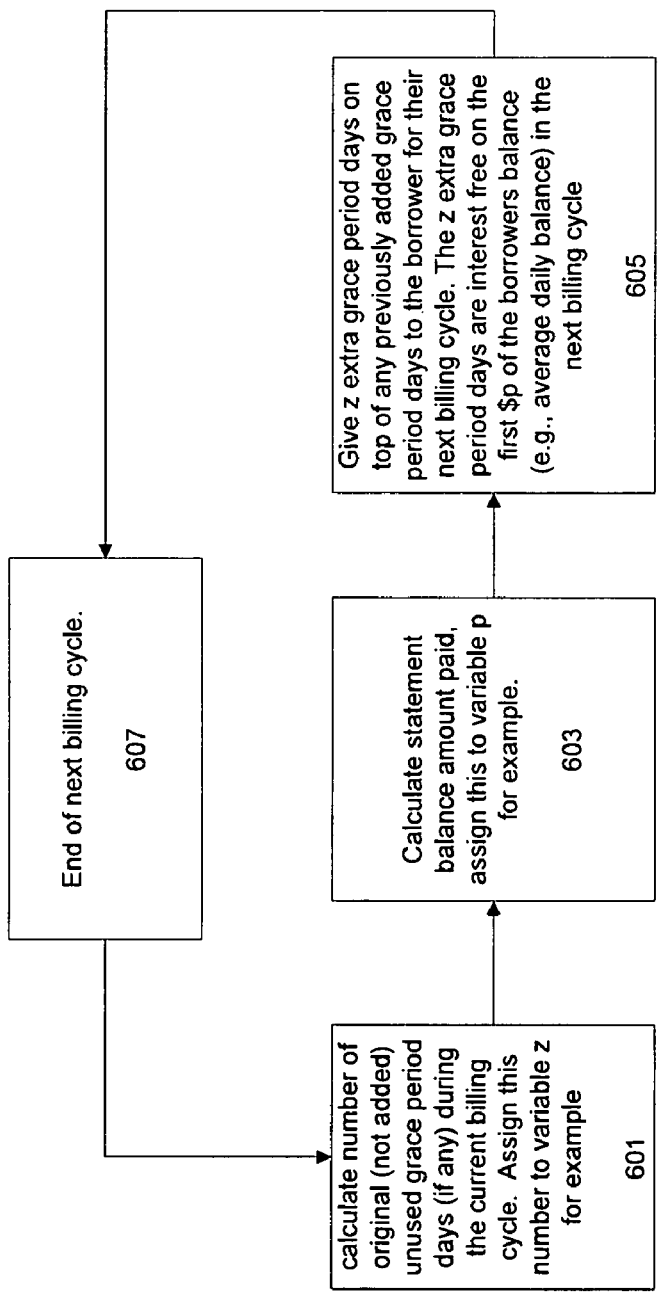
FIG. 6 is a flow chart illustrating an example process for issuing credit for unused interest free grace periods by awarding an extra grace period day for each original unused interest free grace period day, each extra awarded grace period day being interest free for an amount up to the previous statement balance paid.

Referring next to FIG. 6, shown is a flow chart illustrating an example process for issuing credit for unused interest free grace periods by awarding an extra grace period day for each original unused interest free grace period day, each extra awarded grace period day being interest free for an amount up to the previous statement balance paid. First, calculate (601) the number of original (not added) unused grace period days (if any) during the current billing cycle. Assign this number to variable z, for example. Next, calculate (603) the statement balance amount paid, assign this to variable p for example. Finally, give (605) z extra grace period days on top of any previously added grace period days to the borrower for their next billing cycle. The z extra grace period days are interest free on the first $p of the borrowers balance (e.g., average daily balance) in the next billing cycle.

The average daily balance may be calculated by summing the daily outstanding balances and dividing this by the number of days covered in the billing cycle to give an average balance for that period. Other ways of calculating balance may also be used with the processes described herein including but not limited to the adjusted balance, the previous balance and the two-cycle average daily balance. With the adjusted balance, the balance at the end of the billing cycle is may be used and with the previous balance, the balance at the start of the previous billing cycle may be used. The two-cycle average daily balance is the sum of the daily balances of the previous two billing cycles.

Once the end of the next billing cycle is reached (607), the process may be repeated, starting again with calculating (601) the number of original (not added) unused grace period days (if any) during the current billing cycle.

Figure 7:
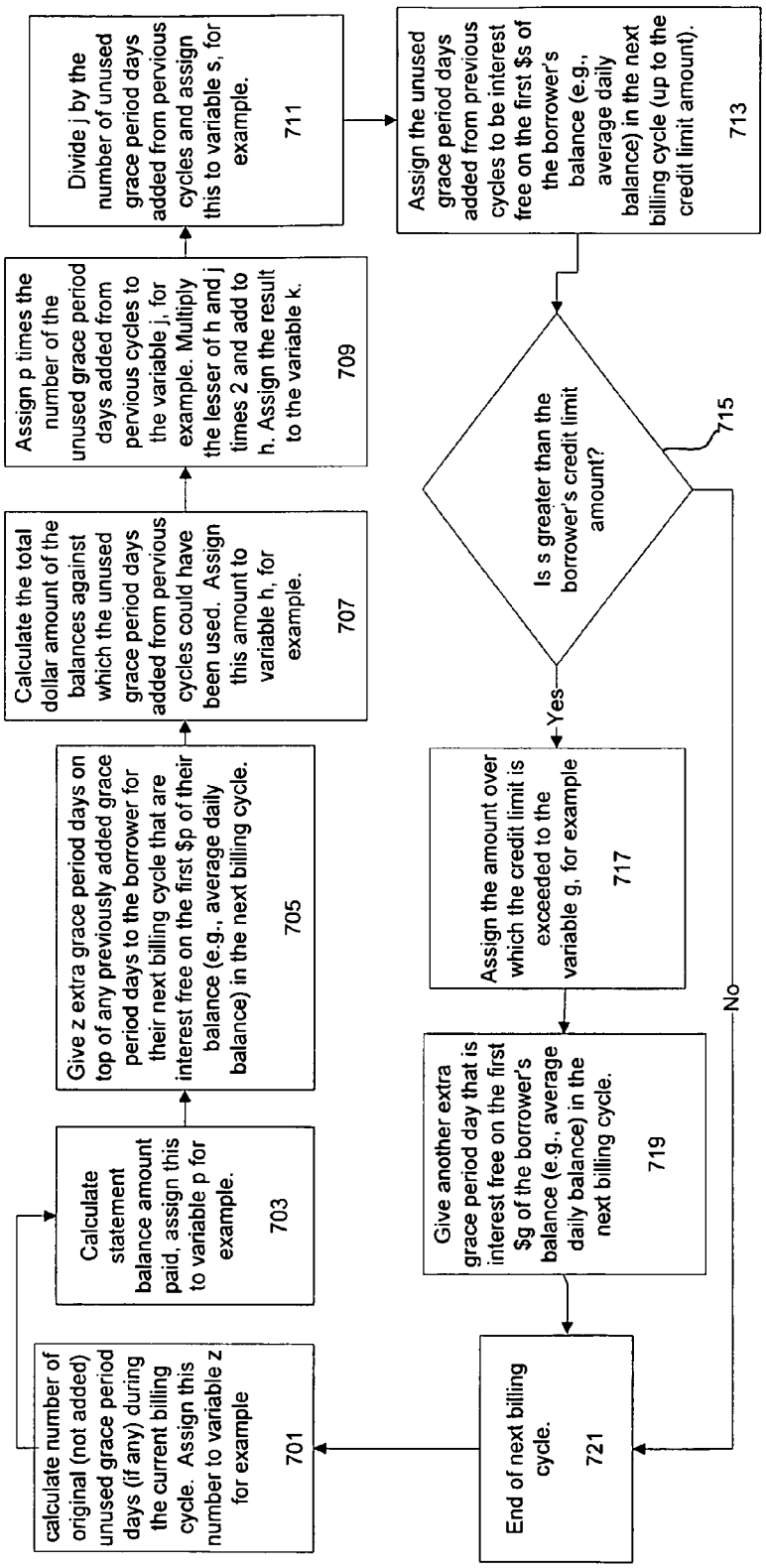
FIG. 7 is a flow chart illustrating an example process for issuing credit for unused interest free grace periods by awarding an extra grace period day for each original unused interest free grace period day, each extra awarded grace period day being interest free for an amount up to the previous statement balance paid, and also adding to the amounts up to which the previously unused added grace period days are interest free based on the statement balance paid.

Referring next to FIG. 7, shown is a flow chart illustrating an example process for issuing credit for unused interest free grace periods by awarding an extra grace period day for each original (not added) unused interest free grace period day, each extra awarded grace period day being interest free for an amount up to the previous statement balance paid, and also adding to the amounts up to which the previously unused added grace period days are interest free based on the statement balance paid. First, calculate (701) number of original (not added) unused grace period days (if any) during the current billing cycle. Assign this number to variable z for example. Then calculate the statement balance amount paid and assign this to variable p for example. Give (705) z extra grace period days on top of any previously added grace period days to the borrower for their next billing cycle that are interest free on the first $p of their balance (e.g., average daily balance) in the next billing cycle.

Then calculate the total dollar amount of the balances against which the unused grace period days added from previous cycles could have been used. Assign this amount to variable h, for example. Assign (709) p times the number of the unused grace period days added from previous cycles to the variable j, for example. Multiply the lesser of h and j times 2 and add to h. Assign the result to the variable k. Divide (711) k by the number of unused grace period days added from previous cycles and assign this to variable s, for example. Assign (713) the unused grace period days added from previous cycles to be interest free on the first $s of the borrower's balance (e.g., average daily balance) in the next billing cycle (up to the borrower's credit limit amount).

Then determine (715) whether s is greater than the borrower's credit limit amount. If s is not greater than the borrower's credit limit amount, then once the end of the next billing cycle is reached (721), the process may be repeated for the next billing cycle, starting again with calculating (701) the number of original (not added) unused grace period days (if any) during the next billing cycle. If s is greater than the borrower's credit limit amount, then assign (717) the amount over which the credit limit is exceeded by s to the variable g, for example. Then give another extra grace period day that is interest free on the first $g of the borrower's balance (e.g., average daily balance) in the next billing cycle. Once the end of the next billing cycle is reached (721), the process may be repeated for the next billing cycle, starting again with calculating (701) the number of original (not added) unused grace period days (if any) during the next billing cycle.

Using the process described above regarding FIG. 7 as an example, say a borrower has a credit limit of $5000 and a 25 day interest free grace period. During their first billing cycle the borrower paid their entire statement balance of $3000 6 days before their grace period ended and thus had 6 unused grace period days at the end of their billing cycle. They are then awarded 6 extra grace period days for use in subsequent billing cycles that are interest free up to $3000 (their paid statement balance) for each extra awarded day. Say the next billing cycle they paid their entire statement balance of $1000 10 days after their grace period started, thus they have 15 days of unused original (not added) grace period days and 6 days after that of unused added grace period days that were interest free up to $3000 each day. Thus, they will be awarded 15 extra grace period days for use in subsequent billing cycles that are interest free up to $1000 for each extra awarded day.

Next the total dollar amount is calculated of the balances against which the unused grace period days added from previous cycles could have been used. This is 6 days at $3000 each (added from the previous billing cycle). So this total is $18,000. Next we multiply the current statement balance paid (p) times the number of the unused grace period days added from previous cycles. since 6 days were added during the previous cycle, this is 6 times $1000, or $6000. Next the lesser of $18,000 and $6000 is multiplied times 2 (resulting in $12,000) to give credit for those unused added grace period days. The lesser of the two is chosen because the borrower could not have used those 6 extra added days as interest free days for an amount more than their current statement balance actually is.

This $12,000 is then added to the previously calculated total dollar amount ($18,000) of the balances for which the unused grace period days added from previous were interest free. This sum is assigned to variable k. Thus, the variable k is now equal to $30,000 ($12,000+$18,000), and then instead of awarding extra grace period days, this $30,000 is distributed evenly over the unused grace period days that were awarded from previous cycles, so each awarded unused grace period day from previous billing cycles will be interest free for up to the same greater amount. This results in those 6 unused grace period days awarded from the previous billing cycle now, instead of $3000, being interest free on the first $5000 (.i.e. $30,000 divided by 6) of the borrower's statement balance for the next billing cycle. $5000 just happens to be the borrower's credit limit, but if the amount calculated happened to be above the credit limit (say $6000), then another extra grace period day would also be awarded that is interest free on the first $1,000 of the borrower's statement balance for the next billing cycle. The entire process may then be repeated for subsequent billing cycles.

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A non-transitory computer readable medium comprising computer readable instructions executable by a processor to perform a method for issuing credit for unused interest free grace periods, comprising computer readable instructions for:
   electronically calculating a number of unused interest free grace period days, wherein the number of unused interest free grace period days includes a number of days a payment for a statement balance of a borrower is received prior to a due date;
   electronically calculating an amount of an award to the borrower based on the calculated number of unused grace period days and the statement balance paid by the borrower, wherein the award is applied to the account of the borrower in a subsequent billing cycle; and
   wherein the award is in addition to a number of interest free grace period days for the subsequent billing cycle.

2. The computer readable medium of claim 1, wherein the award comprises one or more additional interest free grace period days to be made available to the borrower based on the calculated number of unused grace period days and the statement balance paid by the borrower.

3. The computer readable medium of claim 2, further comprising computer readable instructions for awarding the one or more additional interest free grace period days to the borrower in the subsequent billing cycle.

4. The computer readable medium of claim 3, further comprising computer readable instructions for sending out a statement at an end of a current billing cycle with a due date based on a current grace period for said current billing cycle taking into account the one or more additional interest free grace period days awarded the borrower.

5. The computer readable medium of claim 4, further comprising computer readable instructions for repeating each step starting with electronically calculating the number of unused interest free grace period days.

6. The computer readable medium of claim 1, wherein the award comprises one or more of the following: a rebate, a reward, points, a coupon, travel miles, free insurance on purchases, credit card payment protection insurance, skipping one or more payments interest free, cash back, reduced interest rate, putting positive information on a credit report of the borrower, putting positive information on an internal credit report or evaluation of the borrower, instantly reducing a balance due within the current billing cycle, and increasing a credit limit of the borrower.

7. A non-transitory computer readable medium comprising computer readable instructions executable by a processor to perform a method for issuing credit for unused interest free grace periods, comprising computer readable instructions for:
- sending out a statement at an end of a current billing cycle with a due date based on a current grace period for said billing cycle;
- determining whether a payment for the statement balance has been received before the due date;
- electronically calculating a number of unused grace period days in response to determining that the payment was received before the due date, wherein the number of unused grace period days include a number of days the payment was received before the due date;
- electronically calculating an amount of an award to a borrower based on the calculated number of unused grace period days, wherein the award is applied to the account of the borrower in a subsequent billing cycle; and
- wherein the award is in addition to a number of grace period days for the subsequent billing cycle.

8. The computer readable medium of claim 7, wherein the computer readable instructions for electronically calculating the amount of the award to the borrower comprise computer readable instructions for calculating said amount based on the calculated number of unused grace period days and the statement balance paid by the borrower.

9. The computer readable medium of claim 7, wherein the award comprises one or more additional interest free grace period days to be made available to the borrower based on the calculated number of unused grace period days and the statement balance paid by the borrower.

10. The computer readable medium of claim 9, further comprising computer readable instructions for awarding the one or more additional interest free grace period days to the borrower in a subsequent billing cycle.

11. The computer readable medium of claim 10, wherein the one or more interest free grace period days are interest free for an amount up to the statement balance paid.

12. The computer readable medium of claim 7, wherein the award comprises one or more of the following: a rebate, a reward, points, a coupon, travel miles, free insurance on purchases, credit card payment protection insurance, skipping one or more payments interest free, cash back, reduced interest rate, putting positive information on a credit report of the borrower, putting positive information on an internal credit report or evaluation of the borrower, instantly reducing a balance due within the current billing cycle, and increasing a credit limit of the borrower.

13. A non-transitory computer readable medium comprising computer readable instructions executable by a processor to perform a method for issuing credit for unused interest free grace periods, comprising computer readable instructions for:
- electronically calculating a number of unused grace period days during a current billing cycle of a borrower, wherein the number of unused grace period days includes a number of days a payment for a statement balance of the borrower is received prior to a due date and wherein the resulting number is represented by the variable z;
- electronically calculating an interest charge that would have been charged over z days had the statement balance not been paid by an end of the grace period, wherein the resulting calculated charge is represented by the variable c;
- electronically adding any remainder left in a previous calculation of extra grace period days from a previous billing cycle to c after converting said remainder to a dollar amount;
- electronically dividing c by a predetermined amount selected by a lender, wherein the resulting number is represented by the variable d, and wherein if the division is not even, then saving any remainder for future calculations; and
- giving d extra interest free grace period days to the borrower for a next billing cycle, wherein the d extra free grace period days are applied to the account of the borrower in the next'billing cycle and are in addition to a number of interest free grace period days for the next billing cycle.

14. The computer readable medium of claim 13, wherein the predetermined amount selected by a lender is substantially equal to a credit limit of the borrower.

15. The computer readable medium of claim 13, further comprising computer readable instructions for repeating the steps for one or more billing cycles starting with electronically calculating a number of unused grace period days during the current billing cycle of the borrower.

16. The computer readable medium of claim 15, further comprising computer readable instructions for sending out a statement at an end of the current billing cycle with a due date based on a current grace period for said billing cycle accounting for any extra interest free grace period days previously given to the borrower.

17. The computer readable medium of claim 13, wherein the extra interest free grace period days are interest free for an amount up to one of the following: a previous statement balance paid by the borrower, a credit limit of the borrower, and an amount predetermined by the lender.

18. The computer readable medium of claim 13, wherein the billing cycle is that of a credit card.

19. The computer readable medium of claim 13, further comprising computer readable instructions for providing an option to the borrower wherein the borrower may electronically select a different award instead of receiving one or more of the extra interest free grace period days, the different award consisting of one or more of the following: a rebate, a reward, points, a coupon, travel miles, free insurance on purchases, credit card payment protection insurance, skipping one or more payments interest free, cash back, reduced interest rate, putting positive information on a credit report of the borrower, putting positive information on an internal credit report or evaluation of the borrower, instantly reducing a balance due within the current billing cycle, and increasing a credit limit of the borrower.

20. A non-transitory computer readable medium comprising computer readable instructions executable by a processor to perform a method for issuing credit for unused interest free grace periods, comprising computer readable instructions for:
   electronically calculating a number of original unused grace period days during a current billing cycle, wherein the number of original unused grace period days includes a number of days a payment for a statement balance of a borrower is received prior to a due date and wherein the resulting number is represented by the variable z;
   electronically calculating the statement balance amount paid by the borrower, wherein the resulting number is represented by the variable p and wherein p represents the statement balance of the borrower in the current billing cycle; and
   giving z extra grace period days on top of any previously added grace period days to the borrower for a next billing cycle of the borrower, wherein the z extra grace period days are interest free on the first p amount of a balance of the account of the borrower in a next billing cycle and wherein the z extra grace period days are in addition to a number of original grace period days and previously added grace period days for the next billing cycle.

21. The computer readable medium of claim 20, wherein the balance of the borrower is based upon one of the following: an average daily balance, an adjusted balance, a previous balance, and a two-cycle average daily balance.

22. The computer readable medium of claim 20, further comprising computer readable instructions for repeating the steps for one or more billing cycles starting with electronically calculating a number of original unused grace period days during a current billing cycle.

23. The computer readable medium of claim 22, further comprising computer readable instructions for sending out a statement at an end of the current billing cycle with a due date based on a current grace period for said billing cycle accounting for any extra interest free grace period days previously given to the borrower.

24. The computer readable medium of claim 20, wherein the extra interest free grace period days are interest free for an additional amount up to the credit limit of the borrower.

25. The computer readable medium of claim 20, wherein the billing cycle is that of a credit card.

26. The computer readable medium of claim 20, further comprising computer readable instructions for providing an option to the borrower wherein the borrower may electronically select a different award instead of receiving one or more of the extra interest free grace period days, the different award consisting of one or more of the following: a rebate, a reward, points, a coupon, travel miles, free insurance on purchases, credit card payment protection insurance, skipping one or more payments interest free, cash back, reduced interest rate, putting positive information on a credit report of the borrower, putting positive information on an internal credit report or evaluation of the borrower, instantly reducing a balance due within the current billing cycle, and increasing a credit limit of the borrower.

27. A non-transitory computer readable medium comprising computer readable instructions executable by a processor to perform a method for issuing credit for unused interest free grace periods, comprising computer readable instructions for:
   electronically calculating a number of original unused grace period days during a current billing cycle, wherein the number of original unused grace period days includes a number of days a payment for a statement balance of a borrower is received prior to a due date and wherein the resulting number is represented by the variable z;
   electronically calculating the statement balance amount paid by the borrower, wherein the resulting number is represented by the variable p and wherein p represents the statement balance of the borrower in the current billing cycle;
   giving z extra grace period days on top of any previously added grace period days to the borrower for a next billing cycle of the borrower, wherein the z extra grace period days are interest free on the first p amount of a balance of the account of the borrower in the next billing cycle;
   calculating a total dollar amount of the balances against which unused grace period days added from previous billing cycles could have been used, wherein the resulting number is represented by the variable h;
   multiplying p times a number of the unused grace period days added from previous cycles, wherein the resulting number is represented by the variable j;
   multiplying the lesser of h and j by 2 and then adding h, wherein the resulting number is represented by the variable k;
   dividing k by the number of unused grace period days added from previous billing cycles, wherein the resulting number is represented by the variable s; and
   assigning the unused grace period days added from previous cycles to be interest free on the first s of the borrower's account in the next billing cycle, wherein the unused grace period days added are in addition to a number of original grace period days for the next billing cycle.

28. The computer readable medium of claim 27, wherein the balance of the borrower is based upon one of the following: an average daily balance, an adjusted balance, a previous balance, a two-cycle average daily balance.

29. The computer readable medium of claim 27, further comprising computer readable instructions for repeating the steps for one or more billing cycles starting with electronically calculating a number of original unused grace period days during a current billing cycle.

30. The computer readable medium of claim 29, further comprising computer readable instructions for sending out a statement at an end of the current billing cycle with a due date based on a current grace period for said billing cycle accounting for any extra interest free grace period days previously given to the borrower.

31. The computer readable medium of claim 27, wherein assigning the unused grace period days added from previous cycles to be interest free on the first s of the borrower's in the next billing cycle comprises assigning the unused grace period days added from previous cycles to be interest free on the first s of the borrower's in the next billing cycle up to a credit limit of the borrower and further comprises giving another extra grace period day in the next billing cycle that is interest free up to an amount that which s exceeded the credit limit of the borrower.

32. The computer readable medium of claim 27, wherein the billing cycle is that of a credit card.

33. The computer readable medium of claim 27, further comprising computer readable instructions for providing an option to the borrower wherein the borrower may electronically select a different award instead of receiving one or more of the extra interest free grace period days, the different award consisting of one or more of the following: a rebate, a reward, points, a coupon, travel miles, free insurance on purchases, credit card payment protection insurance, skipping one or more payments interest free, cash back, reduced interest rate, putting positive information on a credit report of the borrower, putting positive information on an internal credit report or evaluation of the borrower, instantly reducing a balance due within the current billing cycle, and increasing a credit limit of the borrower.

* * * * *